United States Patent
Aldridge et al.

(10) Patent No.: US 6,711,582 B2
(45) Date of Patent: *Mar. 23, 2004

(54) METHOD AND SYSTEM FOR IMPLEMENTING PERSISTENT OBJECT SERVICES ON A RELATIONAL DATABASE

(75) Inventors: Amy S. Aldridge, Indianapolis, IN (US); Suresh Narayana Murthy, Indianapolis, IN (US); Gordon Scott Rulong, Indianapolis, IN (US); Tingting Xu, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/180,642

(22) Filed: Jun. 25, 2002

(65) Prior Publication Data

US 2002/0194155 A1 Dec. 19, 2002

Related U.S. Application Data

(62) Division of application No. 09/368,698, filed on Aug. 5, 1999, now Pat. No. 6,470,354.

(51) Int. Cl.$^7$ .............................................. G06F 17/30
(52) U.S. Cl. ......................................... 707/103 Y; 707/3
(58) Field of Search ...................... 707/3–4, 102–104.1; 709/102, 209, 217, 250; 717/6.5

(56) References Cited

U.S. PATENT DOCUMENTS

| | | | |
|---|---|---|---|
| 5,291,583 A | 3/1994 | Bapat | 717/137 |
| 5,295,256 A | 3/1994 | Bapat | 717/137 |
| 5,297,279 A * | 3/1994 | Bannon et al. | 707/103 R |
| 5,369,761 A | 11/1994 | Conley et al. | 707/2 |
| 5,499,371 A | 3/1996 | Henninger et al. | 717/108 |
| 5,546,576 A | 8/1996 | Cochrane et al. | 707/2 |
| 5,694,598 A | 12/1997 | Durand et al. | 707/103 R |
| 5,734,887 A | 3/1998 | Kingberg et al. | 707/4 |
| 5,754,841 A | 5/1998 | Carino, Jr. | 707/3 |
| 5,761,671 A | 6/1998 | Blackman et al. | 707/103 R |
| 5,787,436 A * | 7/1998 | Blackman et al. | 707/103 R |
| 5,794,247 A | 8/1998 | Blackman et al. | 707/103 R |
| 5,794,248 A | 8/1998 | Blackman et al. | 707/103 R |
| 5,809,506 A | 9/1998 | Copeland | 707/103 R |
| 5,809,507 A | 9/1998 | Cavanaugh, III | 707/103 R |
| 5,864,843 A | 1/1999 | Carino, Jr. et al. | 707/4 |
| 6,076,090 A | 6/2000 | Burroughs et al. | 707/102 |
| 6,163,776 A | 12/2000 | Periwal | 707/4 |
| 6,175,829 B1 * | 1/2001 | Li et al. | 707/3 |
| 6,470,354 B1 * | 10/2002 | Aldridge et al. | 707/101 |

* cited by examiner

*Primary Examiner*—Jean R. Homere
*Assistant Examiner*—Mohammad Ali
(74) *Attorney, Agent, or Firm*—Jeffrey S. LaBraw; Joseph R. Burwell

(57) ABSTRACT

A persistent object service (POS) that interfaces to a set of one or more relational database management systems. A persistent object is mapped to one or more tables in a relational database based on the object's attribute types and the object's relationships with other objects. If the object inherits from another object, the mapping creates multiple tables, a top level table for base attributes, and a set of one or more child tables that contain extended attributes of the inherited objects. A routine for storing an object converts persistent object operations to a sequence of SQL statements for storing the object in the relational database.

16 Claims, 5 Drawing Sheets

| TYPE | ORACLE | INFORMIX | SYBASE | SQLSERVER | DB2 |
|---|---|---|---|---|---|
| SHORT | NUMBER (5) | SMALLINT | SMALLINT | SMALLINT | SMALLINT |
| USHORT | NUMBER (5) | SMALLINT | SMALLINT | SMALLINT | SMALLINT |
| LONG | NUMBER (10) | INTEGER | INT | INT | INT |
| ULONG | NUMBER (10) | INTEGER | INT | INT | INT |
| FLOAT | NUMBER (7, 2) | SMALLFLOAT | REAL | REAL | FLOAT |
| DOUBLE | NUMBER (38, 2) | FLOAT | FLOAT | FLOAT | FLOAT |
| CHAR | CHAR (1) | CHAR (1) | CHAR (1) | CHAR (1) | CHAR (1) |
| STRING | VARCHAR2 (2000) | VARCHAR (255) | VARCHAR (255) | VARCHAR (255) | VARCHAR (255) |
| STRING (PK) | VARCHAR2 (1500) | VARCHAR (254) | VARCHAR (255) | VARCHAR (255) | VARCHAR (250) |
| LSTRING | LONG | TEXT | TEXT | TEXT | LONG VARCHAR |
| LSTRING (PK) | VARCHAR2 (1500) | VARCHAR (254) | VARCHAR (255) | VARCHAR (255) | VARCHAR (250) |
| DATETIME | DATE VARCHAR (8) | DATE VARCHAR (8) | DATE VARCHAR (8) | DATE VARCHAR (8) | DATE VARCHAR (8) |
| BOOLEAN | NUMBER (1) | SMALLINT | BOOLEAN | BOOLEAN | SMALLINT |

*FIG. 4*

METHOD AND SYSTEM FOR IMPLEMENTING PERSISTENT OBJECT SERVICES ON A RELATIONAL DATABASE

CROSS-REFERENCE TO RELATED APPLICATIONS

This is a divisional application of U.S. patent application Ser. No. 09/368,698, filed Aug. 5, 1999, titled "Implementing persistent object services (POS) on top of a relational database". now U.S. Pat. No. 6,470,354.

BACKGROUND OF THE INVENTION

1. Field of the Invention

This invention relates generally to database management. In particular, this invention relates to methods for mapping data between an object-oriented data model and a relational data model.

2. Description of Related Art

A relational database management system (RDBMS) is a computer database management system that uses relational techniques for storing and retrieving data. Relational databases are computerized information storage and retrieval systems in which data in the form of tables (or relations) are typically stored for use on disk drives or similar mass datastores. A table includes a set of rows (or records) spanning several columns. Each column in a table typically includes restrictions on the data contents thereof. An RDBMS is structured to accept commands to store, retrieve and delete data using high-level query languages such as the Structured Query Language (SQL). A query denotes a set of commands for retrieving data from a stored database.

Object-oriented programming methodologies are also well-known in the prior art. Such methods focus on manipulating data rather than procedures. In an object-oriented paradigm, objects encapsulate related data and procedures to hide that information from the remainder of the program by allowing access to the data and procedures only through the object's interface. Thus, changes to the data or procedures of the object are relatively isolated from the remainder of the program.

An object-oriented computing environment typically includes an object-oriented database for storing data according to an object-oriented database schema. The object-oriented database schema specifies the information needed to define the classes and class hierarchy for the objects stored in the object-oriented database, such as the attributes for each class, the data type of each attribute, and the like. A given object may be transient or persistent. A persistent object is an object whose state can outlive the life of a specific instance of the object.

An object-oriented environment may be distributed across computers interconnected by a computer network. A distributed object refers to an encapsulated package of code and data that can be manipulated by operations through an interface. Distributed objects can be located anywhere in a network as clients or servers, depending upon whether they are sending requests to other objects or replying to requests from clients.

Given the popularity of relational databases as well as the widespread implementation of object-oriented programming methods, it has become necessary to provide tools by which object-oriented applications can fetch data from relational databases. In response, the prior art has developed several different approaches to this problem. In one approach, as represented in U.S. Pat. Nos. 5,761,671, 5,794,247 and 5,794,248, to Blackman et al., commonly assigned to IBM, a bridge is used to translate data between object-oriented and non-object-oriented datastores. The bridge provides a datastore persistent object class to wrap or encapsulate data retrieved from the relational database, a queryable persistent identifier to specify information used to locate the data in the relational database needed to populate a given object, and a schema mapper class used to obtain the required data from the relational database and to translate or transfer it into the format of the particular requesting object.

Another approach to this problem is illustrated in U.S. Pat. No. 5,765,159, to Srinivasan, also assigned to IBM. This patent provides a method for processing object-oriented queries to retrieve data from a relational database. An object-oriented query and at least one prefetch path are received from an object-oriented program. The prefetch path identifies one or more objects that are desired to be constructed. The query is translated to a translated object query, which is a relational database query capable of retrieving from the RDBMS data to initialize base attributes of top-level objects identified by the query. A set of relational queries is generated from the translated object query and the prefetch path. These relational queries are processed by the RDBMS.

Still other approaches to the problem of mapping data between a relational format and an object-oriented format are described in several patents, including, U.S. Pat. No. 5,694,598 to Durand et al., U.S. Pat. No. 5,499,371 to Henninger et al., U.S. Pat. No. 5,734,887 to Kingberg et al., to name just a few. In Durand et al., which is a distributed object operating environment, the invention uses a special construct, a so-called transit object, for this purpose. In Henninger et al., the relational database interaction is controlled directly by the methods of the object class, e.g., using embedded SQL. Kingberg et al. use a logical data access layer to access the physical structure of a relational database.

Although the above-described patents all provide useful techniques for enabling object-oriented access to a relational database, there remains a need in the art to provide a persistent object service (POS) that can interface with all of the major different types of relational databases including, for example, Oracle, Sybase, MS-SQL Server, Informix and DB2. The present invention addresses this need in the art.

SUMMARY OF THE INVENTION

It is a general feature of the invention to map data between an object-oriented format and a relational format.

It is another general feature of this invention to provide a generic persistent object service (POS) that may interface to different and varied relational database management systems.

Another general feature of this invention is to map objects to one or more tables in a relational database based on the object's attribute types.

Still another feature of this invention is to provide a novel mechanism for storing an object in a relational database, and for restoring that object from data retrieved from that database.

These and other features of the present invention are provided in a persistent object service (POS) that interfaces to a set of one or more relational database management systems. A persistent object, namely, an object whose state may outlive the life of a specific instance of the object, is mapped to one or more tables in a relational database based on the object's attribute types and the object's relationships with other objects. If the object inherits from another object, the mapping creates multiple tables, a top level table for base attributes, and a set of one or more child tables that contain extended attributes of the inherited objects. The service includes an object store routine for storing an object by converting persistent object operations to a sequence of SQL statements. The service also includes an object restore routine for re-generating the object by retrieving object attribute information from the relational tables.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 4 is a table generated by the schema mapping;

DETAILED DESCRIPTION OF THE INVENTION

Figure 1:
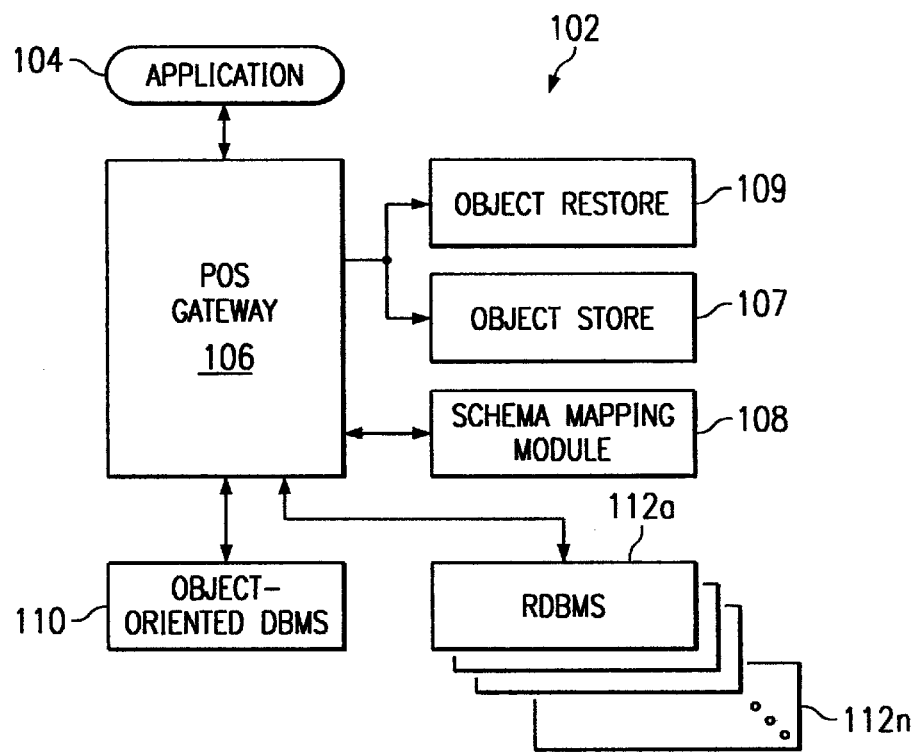
FIG. 1 is a block diagram of an object-oriented computing environment according to a preferred embodiment of the present invention.

FIG. 1 is a block diagram of an object-oriented computing environment 102 in which the present invention may be implemented. The object-oriented computing environment includes at least one object-oriented database management system (DMBS) 110 that stores data according to an object-oriented database schema. The object-oriented database schema specifies the information needed to define the classes and the class hierarchy for the object stored in the object-oriented DMBS 110, such as the attributes for each class, the data type of each attribute, and the like.

The object-oriented computing environment 102 also includes one or more relational database management systems (RDBMS) 112a–112n. The RDBMS 112 can also be viewed at outside of the object-oriented computing environment 102, but physically connected to components in the object-oriented computing environment 102 (in particular, to a gateway 106). A suitable form of the RDBMS 112 is DB2 for AIX/6000 Version 2, DB2 for Windows NT Version 2, DB2 Universal Database Server V5 for AIX/6000, Sun Solaris, and Windows NT, each produced by IBM, Oracle 7.1, 7.2, 7.3 and 80 produced by Oracle Corporation, Sybase System 10 and System 11 produced by Sybase, Inc., SQLServer 4.3 and 6.5 by Microsoft, Informix 5.0, 7.1 and 7.2 produced by Informix Corporation, and others. Object-oriented applications, such as application 104, access the data in the object-oriented DBMS 110. Such access is performed in a well-known manager according to a well-known object-oriented database interface. The object-oriented database interface conforms to the object-oriented database schema of the DMBS 110.

Application 104 accesses data in the RDBMS 112 via a Persistent Object Service (POS) 106 as will be described in more detail below. The Persistent Object Service 106 includes a schema mapping module 108 that maps objects to relational data and vice versa. The Service also includes an object store routine 107 and an object restore routine 109 for the reasons described below.

Figure 2:
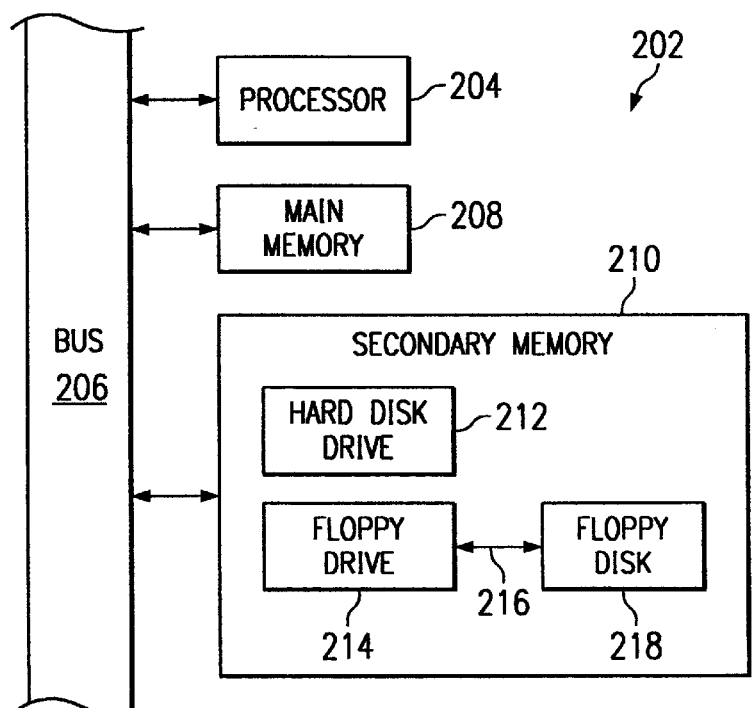
FIG. 2 is a block diagram of a computer system in which the computing environment of FIG. 1 resides.

In one embodiment, the object-oriented computing environment 102 exists in a computer system 202 as shown in FIG. 2. The computer system 202 includes one or more processors, such as processor 204, which is connected to a communication bus 206. The computer system also includes a main memory 208, preferably random access memory (RAM), and a secondary memory 210 that includes, for example, a hard disk drive 212 and a floppy disk drive 214.

The application 104, POS 106, schema mapping module 108, object-oriented DBMS 110, and RDBMS 112 preferably comprise computer programs that reside during runtime in the main memory 208 and that are executed by the processors in the computer system 202, such as processor 204. The data maintained by the object-oriented DBMS 110 and the RDBMS 112 may be stored in the main memory 208 and/or the secondary memory 210. Also, the computer programs associated with the application 104, POS 106, schema mapping module 108, object-oriented DBMS 110 and RDBMS 112 may be stored in a floppy disk 218 or some other removable storage medium.

A representative computer is the well-known RISC System/6000 family of computers produced by IBM running the AIX operating system. Alternatively, the computer comprises an x86 or Pentium class processor and a Microsoft NT or UNIX platform (e.g., AIX, SunOS, Solaris, HP-UX) operating system.

POS 106 and the schema mapping module 118, when executed, enable the computer system 202 to perform the functions of the present invention as discussed herein.

Although not illustrated in detail, one of ordinary skill in the art will appreciate that the present invention may also be implemented in a distributed object operating environment over computers interconnected by a network. In this environment, distributed objects may be object clients or servers depending on whether they are sending requests to other objects or replying to requests from clients. In a distributed object environment, as is well-known, requests and replies are made through an object request broker (ORB) that is aware of the location and status of the objects. One architecture that is suitable for implementing an ORB is described in the Common Object Request Broker Architecture (CORBA) specification.

With the above as background, the present invention can now be described. As noted above, the Persistent Object Service 106 is implemented to support the ability to interface a given object with all major relational databases including, for example, DB2, Oracle, Sybase, SQL Server and Informix. Generally, POS 106 maps persistent objects to relational database tables, and it converts persistent object operations to a sequence of Structured Query Language (SQL) statements to enable persistent object data to be stored and then recalled from the relational database. A persistent object is an object whose state may outlive the life of a specific instance of the object. Relational databases typically are not designed to store data in a format in which object state is described. Thus, POS 106 provides a complete DBMS-independent object-oriented wrapper around the relational database.

Figure 3:
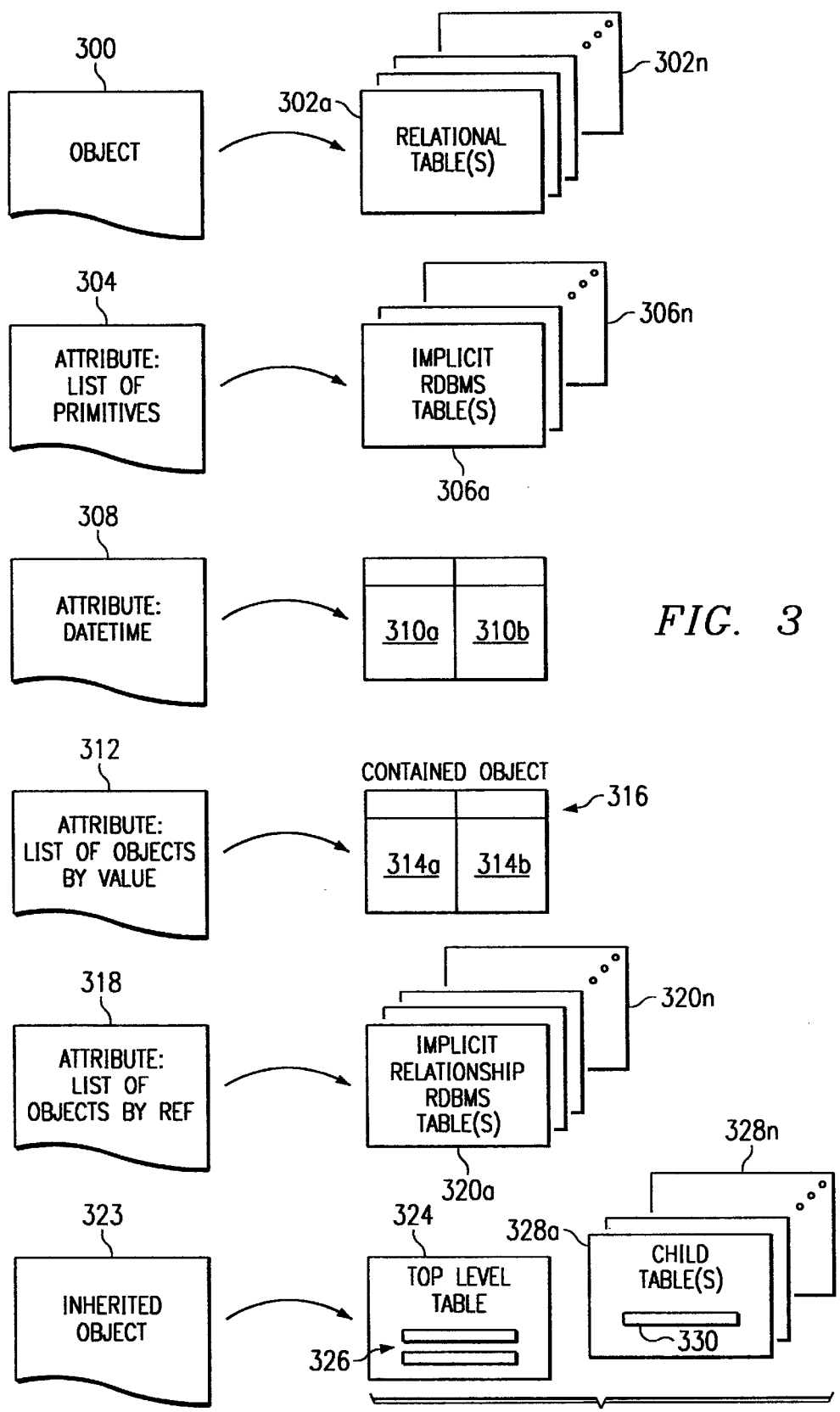
FIG. 3 illustrates an example schema mapping.

As noted above, POS 106 includes a schema mapping module 108 for mapping objects to relational tables. This process is illustrated in more detail in FIG. 3. The schema mapping module receives input data, preferably information from a text-based .ini file. Alternatively, an object can be defined in any convenient data structure or format. Generally, each object 300 is mapped to one or more tables 302*a*–302*n* in the relational database (RDBMS) based on its attribute types and its relationships with other objects.

For attributes 304 that are lists of primitive types, specifically lists of strings, lists of integers, lists of floats, and the like, the schema mapping module maps such attributes to implicit RDBMS tables 306*a*–306*n*. Preferably, each attribute is mapped using an internal name (e.g., a mangled name) that is generated by and known only to POS. For attributes 308 that are of type Datetime, the schema mapping module maps to two columns 310*a*–*b* of type date and time. For attributes 312 that contain a list of other objects by value, the schema mapping module adds two extra columns 314*a*–*b* to a contained object table 316. For attributes 318 that contain a list of other objects by reference, the schema mapping module creates implicit relationship RDBMS tables 320*a*–320*n*. The schema mapping module maps other types of attributes, i.e. those not mentioned above, to single columns in a table 322 as illustrated in FIG. 4. The particular column layout and format is merely representative.

As is well-known, a given object may inherit from another object, referred to as a parent object. The schema mapping module also provides inheritance object-to-table mapping. Referring back to FIG. 3, for a given inherited object 323, the schema mapping module 108 creates multiple tables: a top level table 324 that has the base attributes 326 of the parent object, and one or more child tables 328*a*–328*n* that preferably contain only the extended attributes 330 of the inherited objects. An extended attribute is any additional attribute that further describes the specialization of a given class.

Figure 5:
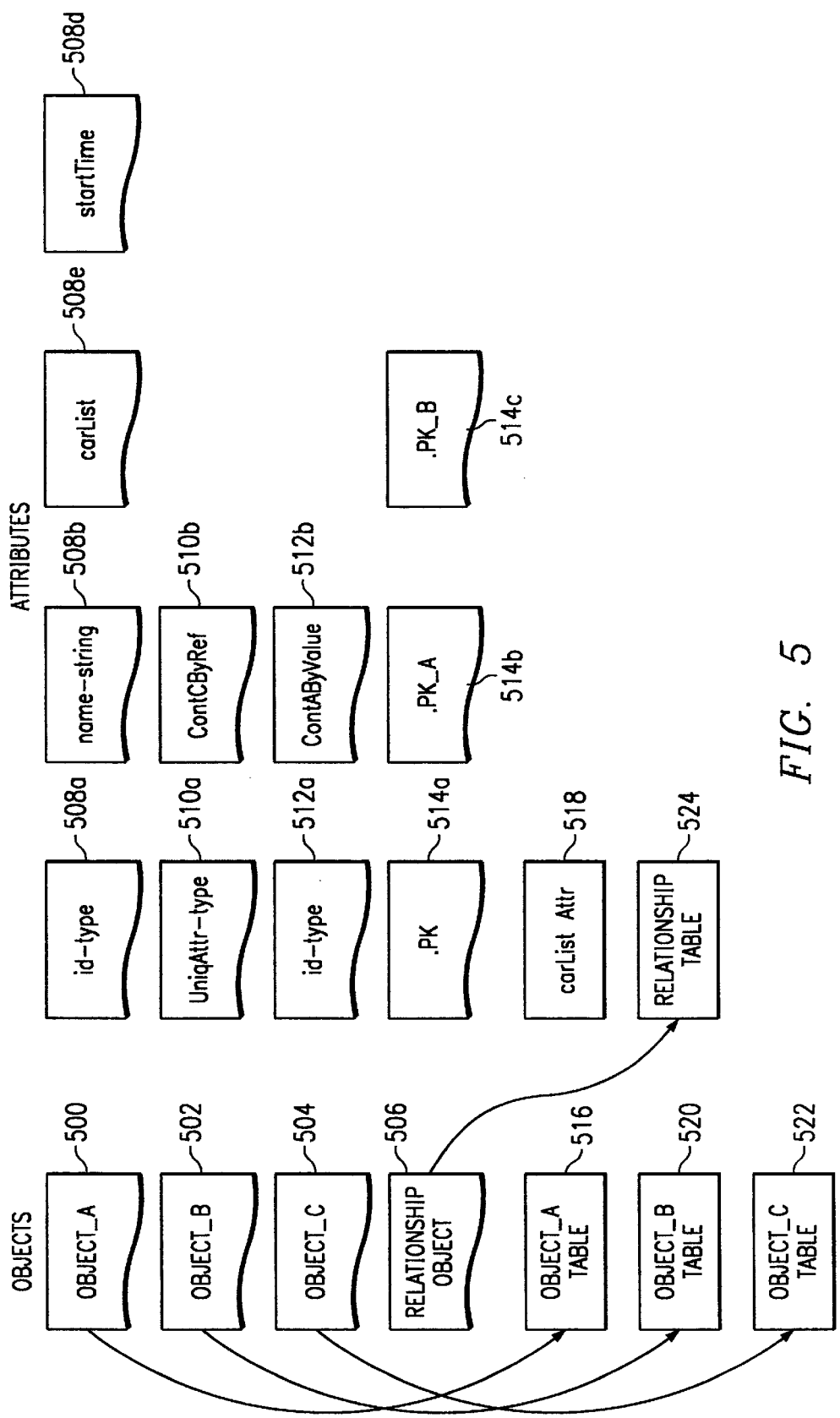
FIG. 5 is an illustrative example of the schema mapping.

The following example illustrates the operation of the schema mapping module in more detail. Reference should also be made to FIG. 5. The objects are defined in an ini file in a well-known manner. In this example, there are three objects: OBJECT_A 500, OBJECT_B 502 and OBJECT_C 504, and one relationship object MREL00A01400C3FF 506. OBJECT_A 500 has four (4) attributes 508*a*–*d*: id-type Integer, name-String, carList—list of strings, and startTime-DateTime:

[OBJECT_A]
id=1
name=OBJECT_A
assocId=-1
isA=
baseAttrCount=3
baseattr0=Id
baseattr1=Name
baseattr2=CarList
baseattr=StartTime
extendedAttrCount=0
[OBJECT_A.id]
id=0
name-Name
pdsName=Name
pdsName2=
selectMask=536870920
attrMask=0
typeId=8
contTypeId=0
contObjTypeId=0
fkAttrId=0
max_string_length=0
nullable=1
[OBJECT_A.Name]
id=1
name=Name
pdsName=Name
pdsName2=
selectMask=536870912
attrMask=0
typeId=8
contTypeId=0
contObjTypeId=0
fkAttrId=0
max_string_length=0
nullable=1
[OBJECT_A.CarList]
id=2
name=CarList
pdsName=CarList
pdsName2=
selectMask=536870912
attrMask=0
typeId=12
contTypeId=8
contObjTypeId=0
fkAttrId=0
max_string_length=0
nullable=1
[OBJECT_A.StartTime]
id=3
name=StartTime
pdsName=StartDate
pdsName2=StartTime
selectMask=536870912
attrMask=0
typeId=4
contTypeId=0
contObjTypeId=0
fkAttrId=0
max_string_length=0
nullable=1

In this illustrative example, OBJECT-B 502 inherits from OBJECT_A 500 and has two (2) attributes 510*a*–510*b*: B_UniqAttr—type Integer, and ContCByRef—contains list of OBJECT-C by reference:

[OBJECT_B]
id=2
name=OBJECT_B
assocId=-1
isA=1 baseAttrCount=2
baseattr0=Id
baseattr1=ContCByRef
extendedAttrCount=0
[OBJECT_B.id]
id=0
name=Id
pdsName=Id
pdsName2=
selectMask=536870920
attrMask=0
typeId=4
contTypeId=0
contObjTypeId=0
fkAttrId=0
max_string_length=0
nullable=0
[OBJECT_B.contCByRef]
id=1
name=contCByRef
pdsName=contCByRef
pdsName2=
selectMask=536870912
attrMask=0
typeId=12
contTypeId=11
contObjTypeId=3
fkAttrId=0
max_string_length=0
nullable=1
OBJECT-C 504 also has two (2) attributes 512a–b: id-type Integer, and ContAByValue—contains list of OBJECT-A by value:
[OBJECT_C]
id=3
name=OBJECT_C
associd=−1
isA=1
baseAttrCount=2
baseattr0=Id
baseattr1=ContAByVal
extendedAttrCount=0
[OBJECT_C.id]
id=1
name=Id
pdsName=Id
pdsName2=
selectMask=536870912
attrMask=0
typeId=4
contTypeId=
contObjTypeId=
fkAttrId=0
max_string_length=0
nullable=0
[OBJECT_C.contAByVal]
id=1
name=contAByVal
pdsName=contAByVal
pdsName2=
selectMask=536870912
attrMask=0
typeId=12
contTypeId=10
contObjTypeId=1
fkAttrId=0
max_string_length=0
nullable=1

Finally, in this example, the relationship object 506 has three (3) attributes 514a–c:
[MREL00A01400C3FF]
id=4
name=MREL00A01400C3FF
assocID=−1
isA=−1
baseAttrCount=3
baseattr0=PK
baseattr1=PK_A
baseattr2=PK_B
extendedAttrCount=0
ExplicitName=
A-id=2
B_id=3
[MREL00A01400C3FF.PK]
id=0
name=PK
pdsName=PK
pdsName2=
selectMask=536870920
attrMask=0
typeId=4
contTypeId=0
contObjTypeId=0
fkAttrId=0
max_string_length=0
nullable=1
[MREL00A01400C3FF.PK_A]
id=1
name=PK_A
pdsName=PK_A
pdsName2=
selectMask=536870912
attrMask=0
typeId=4
contTypeId=0
contObjTypeId=0
fkAttrId=0
max_string_length=0
nullable=1
[MREL00A01400C3FF.PK_B]
id=2
name=PK_B
pdsName=PK_B
pdsName2=

```
selectMask=536870912
attrMask=0
typeId=4
contTypeId=0
contObjTypeId=0
fkAttrId=0
max_string_length=0
nullable=1
```

As described above, the POS 106 and, in particular, the schema mapping module 108, maps the objects to relational tables as follows. As is well-known, a table includes a set of rows spanning several columns. Each column in a table includes restrictions on the data contents thereof and may be designated as a primary or foreign key. For instance, one or more columns in a base table may be assigned a key attribute, such as primary key or foreign key. The primary key of a base table uniquely identifies each record or row in the table. The foreign key of a base table establishes a relationship between the base table and another parent table designated by the foreign key column attribute. Thus, a parent/child relationship may be established between two tables by adding a foreign key column attribute to one and relating it to the primary key column attribute in another, as is well-known in the art. For more information, reference is made to C. J. Date, *An Introduction To Database Systems*, 6$^{th}$ Edition, Addison-Wesley Publishing Co., Reading, Mass. (1994), for a comprehensive general treatment of the relational database art.

Because OBJECT_A is contained by OBJECT_C by value, the schema mapping module first adds foreign key field TSM_FK_FIELD and CONT_ATTR_INDEX. Object_A is then mapped to table OBJECT_A 516 (Id INT, Name varchar(254), startDate DATE, starTime varchar(8), TSM_FK_FIELD NUMBER(10), CONT_ATTR_INDEX NUMBER (5)), and a table 518 is generated for the carList attribute: SA_8_1_2(SA_PK NUMBER(10), SA_FK NUMBER(10), SA_DATA VARCHAR2(2000)). OBJECT_B inherits from OBJECT_A, and thus it is mapped to table OBJECT-B 520 (B_UniqAttr NUMBER (10)). OBJECT_C is mapped to table OBJECT_C 522 (Id NUMBER(10)). The relationship object MREL00A01400C3FF is mapped to TABLE MREL00A01400C3FF 524 (PK NUMBER(10), PK_A NUMBER(10), PK_B NUMBER (10)). Finally, the schema mapping module performs an ALTER TABLE MREL00A01400C3FF ADD CONSTRAINT CONS_MREL00A01400C3FF UNIQUE (PK_A, PK_B) to guarantee the uniqueness of the relationship pair.

The Persistent Object Service 106 also includes a routine 107 for storing an object in the relational database, and a routine 109 for restoring an object from information retrieved from that database. These routines are described in the flowcharts of FIGS. 6-7.

Figures 6, 7:
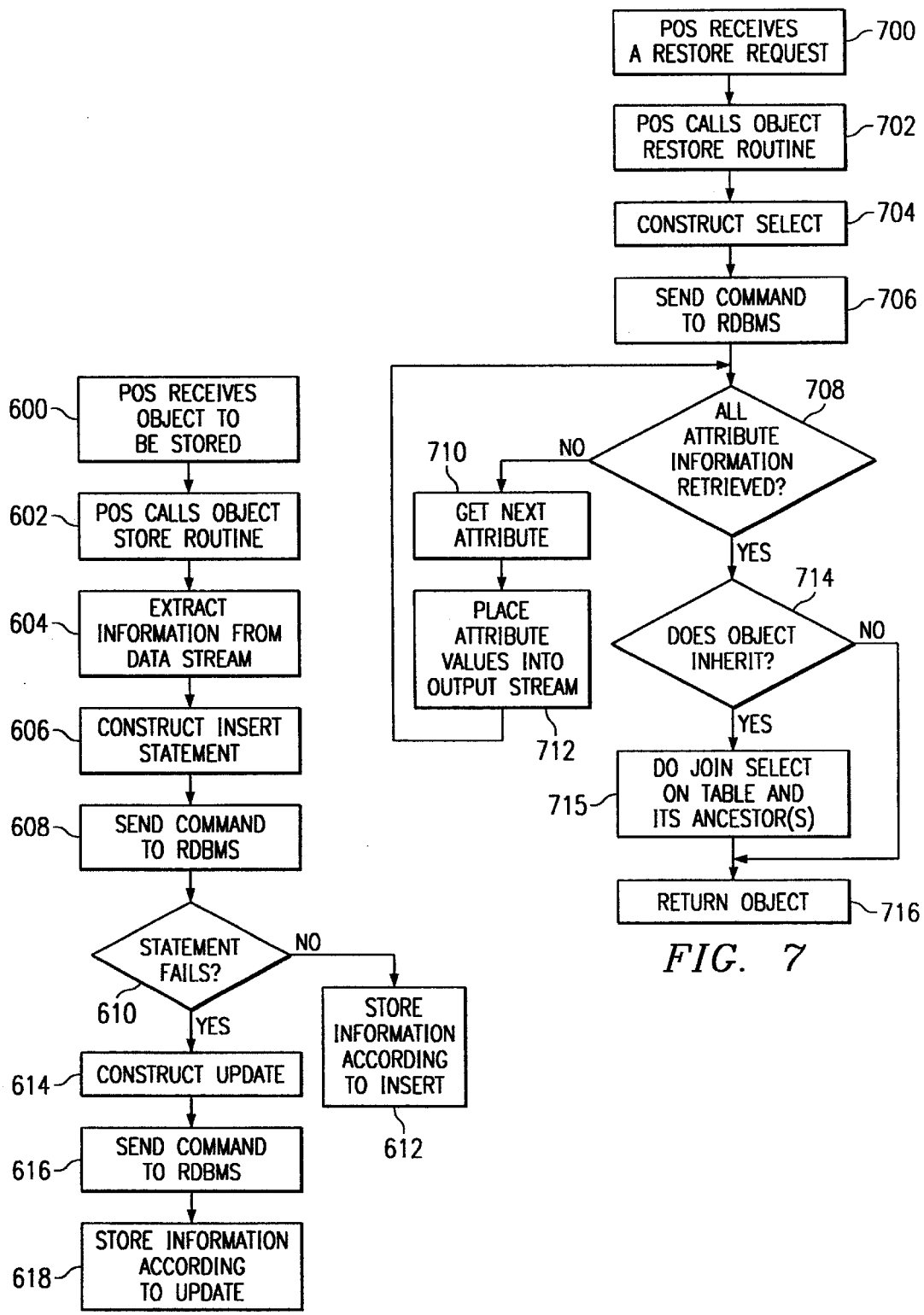
FIG. 6 is a simplified flowchart of a routine for storing an object in the relational database.
FIG. 7 is a simplified flowchart of a routine for restoring an object from data retrieved from the relational database.

The store object method of FIG. 6 begins at step 600 with the POS 106 receiving an object to be stored in the relational database. The object is preferably received from the application in stream format. At step 602, POS 106 calls the object store routine 107. At step 604, the object store routine extracts object information from the stream based on an agreed protocol. The routine then continues at step 606 to construct an "INSERT into . . . " SQL statement.

By way of brief background, an SQL INSERT statement inserts a new row or record into a table. When a new row is inserted into a child table, its foreign key value must match one of the primary key values in a parent table, according to the column attribute. If the foreign key value does not match any primary key, inserting the row corrupts the database because there is now a child without a parent. Such an INSERT is typically rejected by the RDBMS. Inserting a row in a parent table never gives this problem because it simply becomes a parent without children. Updating the foreign key in a child record is a different form of this problem. If the foreign key is modified by an SQL UPDATE statement, the new value must match some primary key value in the parent table to avoid orphaning the updated record. For each parent/child relationship created by a foreign key, SQL provides for an associated delete rule and an associated update rule. The delete rule specifies an action, e.g., RESTRICT, CASCADE, NULL SET and SET DEFAULT, when a users tries to delete a parent record. The update rule specifies one of these actions when a user tries to update the value of one of the primary key columns in the parent table.

Referring now back to FIG. 6, after the object store routine generates the INSERT statement, the command is sent to the relational database. This is step 608. A test is then performed at step 610 to determine if the statement fails, e.g., due to a unique constraint violation. If not, the routine branches to step 612 to store the information according to the INSERT statement. If, however, the INSERT statement fails at step 610, the routine continues at step 614. At this point, the routine constructs an "UPDATE . . . " SQL statement. At step 616, the UPDATE statement is sent to the database. The object information is then stored according to the UPDATE statement at step 618. This completes the processing for the object itself.

In the illustrative flowchart of FIG. 6, the store object routine first generates an INSERT SQL statement followed by an UPDATE SQL statement (in the event the INSERT statement fails). This sequence is not a limitation of the present invention. Alternatively, the store object routine may first generate an UPDATE SQL statement and then generate an INSERT SQL statement in the event the UPDATE statement fails. In either case, the Persistent Object Service hides from the programmer's point of view whether an explicit INSERT or UPDATE is required to write given data to a given relational table.

Following the processing illustrated in FIG. 6, the object's attributes must then be processed and stored in a like manner. The object store routine is then repeated for each type of attribute. In particular, if the object has attributes of list data type (e.g., lists of strings, lists of integers, lists of floats, and the like), the object store routine 107 performs a corresponding INSERT/UPDATE function (as previously described) on the implicit RDBMS list tables. If the object has attributes that contain a list of another object by value, the object store routine INSERTS/UPDATES the corresponding contained object tables. If the object has attributes that contain a list of another object by reference, the object store routine Inserts/Updates the implicit relationship tables correspondingly. If the object inherits from another object, the object store routine Inserts/Updates the object's ancestor(s).

FIG. 7 illustrates the object restore routine 109. This routine begins at step 700 with POS 106 receiving a restore request. At step 702, POS calls the object restore routine. Based on an object id in the restore request, the restore object routine constructs a SQL "SELECT" statement on the corresponding table. This is step 704. At step 706, the object restore routine sends the command to the relational database. At step 708, the routine tests whether all object attribute information has been retrieved. If not, the routine continues at step 710 to get the next attribute. At step 712, the attribute values are placed into the output stream. Control then returns to step 708. Thus, for example, if an attribute is a list type, the restore object routine in step 712 issues another "SELECT" on the list table. If an attribute contains another object by value, the routine in step 712 issues a "SELECT" on the corresponding table. If the attribute contains another object by reference, the restore object in step 712 issues a "SELECT" on the relationship table to get the primary key of the referenced object. When the output of the test at step 708 is positive, all attribute information has been retrieved. The object restore routine then continues at step 714 to determine whether the object inherits from another object. If so, the routine performs a join SELECT on the table and its ancestor(s) table(s). This is step 715. The routine then continues at step 716, which is also reached by a negative outcome of the test at step 714. At step 716, the object is returned to the requesting application. This completes the processing.

Thus, according to the present invention, a Persistent Object Service is implemented on top of a set of one or more relational databases, such as DB2, Oracle, Sybase, SQL Server and Informix. The Persistent Object Service maps persistent objects to relational database tables and converts persistent object operations to a sequence of SQL statements. The invention advantageously maps each object to one or more relational database tables based on the object's attributes and its relationships with other objects. For inheritance object-to-table mapping, a top level table is created for base attributes, and child tables are created that contain only the extended attributes of inherited objects.

Although the particular application of the present invention is not limited, one preferred implementation is for use in an enterprise-wide database environment of a distributed managed architecture, e.g., a Tivoli managed environment. A representative example is an enterprise that includes heterogeneous distributed database environments that must be accessed by mission-critical applications that are dependent on data stored in such databases. While such an implementation is preferred, it is not limiting. The inventive principles may be implemented whenever it is required to store object-oriented data in a relational database backing store. Thus, the principles of the invention may be carried out in an X.500 directory service or hereinafter-developed LDAP implementations.

The invention may also be implemented within a relational database management system being used as an add-on to a directory service. One of ordinary skill will appreciate that the invention can be applied to any relational database management system (RDBMS) and not simply the systems referred to above by way of example.

As described above, one of the preferred embodiments of each routine of this invention is as a set of instructions (e.g., computer program code) in a code module resident in or downloadable to the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by Letters Patent is set forth in the following claims.

What is claimed is:

1. A method of storing object information in a relational database, comprising the steps of:

extracting object information relating to an object from a stream;

constructing an initial SQL statement from the extracted object information;

responsive to a failure of the initial SQL statement, constructing a second SQL statement from the extracted object information, wherein the initial SQL statement is an insert statement and the second SQL statement is an update statement, or wherein the initial SQL statement is an update statement and the second SQL statement is an insert statement; and storing the object information.

2. The method as described in claim 1 wherein an insert statement fails if information for the object is already present in the relational database.

3. The method as described in claim 1 wherein the object information is stored according to the initial statement.

4. The method as described in claim 1 wherein the object information is stored according to the second statement.

5. The method as described in claim 1 wherein the object information is mapped to one or more tables in the relational database according to attributes in the object and their respective relationships with other objects.

6. The method as described in claim 5 wherein a base table in the relational database has a set of base attributes and a set of one or more child tables related to the base table.

7. The method as described in claim 6 wherein a given child table includes only extended attributes of inherited objects.

8. The method as described in claim 1 wherein the relational database is one of a set of relational databases.

9. An apparatus for storing object information in a relational database, the apparatus comprising:

means for extracting object information relating to an object;

means for constructing an initial SQL statement from the extracted object information;

means responsive to a failure of the initial SQL statement for constructing a second SQL statement from the extracted object information, wherein the initial SQL statement is an insert statement and the second SQL statement is an update statement, or wherein the initial SQL statement is an update statement and the second SQL statement is an insert statement; and means for storing the object information.

10. The apparatus as described in claim 9 further including means for mapping object information to one or more tables in the relational database according to attributes in the object and their respective relationships with other objects.

11. The apparatus as described in claim 9 wherein the mapping means generates a base table in the relational database having a set of base attributes and a set of one or more child tables related to the base table.

12. The apparatus as described in claim 11 wherein a given child table includes only extended attributes of inherited objects.

13. A computer program product in a computer readable medium for use in a data processing system for storing object information in a relational database, the computer program product comprising:
- means for extracting object information relating to an object;
- means for constructing an initial SQL statement from the extracted object information;
- means responsive to a failure of the initial SQL statement for constructing a second SQL statement from the extracted object information, wherein the initial SQL statement is an insert statement and the second SQL statement is an update statement, or wherein the initial SQL statement is an update statement and the second SQL statement is an insert statement; and
- means for storing the object information.

14. The computer program product as described in claim 13 further including means for mapping object information to one or more tables in the relational database according to attributes in the object and their respective relationships with other objects.

15. The computer program product as described in claim 13 wherein the mapping means generates a base table in the relational database having a set of base attributes and a set of one or more child tables related to the base table.

16. The computer program product as described in claim 15 wherein a given child table includes only extended attributes of inherited objects.

* * * * *